United States Patent
Zhou et al.

(10) Patent No.: US 8,830,949 B2
(45) Date of Patent: Sep. 9, 2014

(54) METHOD AND APPARATUS FOR IMPLEMENTING BASEBAND RESOURCE POOL IN LTE BASE STATION

(71) Applicant: Huawei Technologies Co., Ltd., Shenzhen (CN)

(72) Inventors: Aiming Zhou, Shanghai (CN); Chunjing Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/718,343

(22) Filed: Dec. 18, 2012

(65) Prior Publication Data

US 2013/0128861 A1    May 23, 2013

Related U.S. Application Data

(63) Continuation of application No. PCT/CN2011/082607, filed on Nov. 22, 2011.

(51) Int. Cl.
*H04L 12/26* (2006.01)
*H04W 72/04* (2009.01)
*H04W 28/08* (2009.01)
*H04W 74/00* (2009.01)
*H04W 74/08* (2009.01)

(52) U.S. Cl.
CPC ............ *H04W 72/04* (2013.01); *H04W 74/006* (2013.01); *H04W 74/0833* (2013.01); *H04W 28/08* (2013.01)
USPC ........... 370/330; 370/329; 370/336; 455/509; 455/510

(58) Field of Classification Search
CPC . H04W 88/06; H04W 72/04; H04W 72/0453; H04W 72/005; H04W 72/0446; H04W 28/16; H04W 72/00; H04W 36/06; H04W 28/26; H04W 16/02; H04W 72/10; H04W 74/00; H04W 72/044; H04W 16/04; H04W 76/021; H04W 72/1257; H04W 52/08; H04W 72/1252
USPC .......... 370/229, 330, 331, 343, 347; 455/455, 455/425, 446, 447, 500, 507, 509, 510
See application file for complete search history.

(56) References Cited

U.S. PATENT DOCUMENTS

2008/0045226 A1*   2/2008   Liu ............................... 455/450
2010/0296485 A1*  11/2010   Kobori ......................... 370/331
(Continued)

FOREIGN PATENT DOCUMENTS

| CN | 101175259 A | 5/2008 |
| CN | 101217786 A | 7/2008 |
| CN | 101232654 A | 7/2008 |
| CN | 101252774 A | 8/2008 |

(Continued)

OTHER PUBLICATIONS

International Search Report issued in corresponding PCT Patent Application No. PCT/CN2011/082607, mailed Sep. 6, 2012.

*Primary Examiner* — Awet Haile
(74) *Attorney, Agent, or Firm* — Brinks Gilson & Lione

(57) ABSTRACT

In a method for implementing a baseband resource pool in an LTE base station provided in the present invention, the LTE base station includes a main control module, a master board, and a slave board, and the master board and the slave board include baseband processing modules. In the method for implementing a baseband resource pool in an LTE base station provided in the present invention, the RACH processing capability of the LTE base station is improved by adding a slave baseband board including a baseband processing module.

9 Claims, 7 Drawing Sheets

(56) References Cited

U.S. PATENT DOCUMENTS

2011/0189972 A1* 8/2011 Sato et al. .................. 455/404.1
2011/0269454 A1* 11/2011 Zhang et al. .................. 455/424
2012/0129517 A1* 5/2012 Fox et al. ...................... 455/425

FOREIGN PATENT DOCUMENTS

| CN | 101742683 A | 6/2010 |
| EP | 1868406 A2 | 12/2007 |
| WO | WO 2011/137408 A2 | 11/2011 |

* cited by examiner

METHOD AND APPARATUS FOR IMPLEMENTING BASEBAND RESOURCE POOL IN LTE BASE STATION

CROSS-REFERENCE TO RELATED APPLICATIONS

This application is a continuation of International Application No. PCT/CN2011/082607, filed on Nov. 22, 2011, which is hereby incorporated by reference in its entirety.

FIELD OF THE INVENTION

The present invention relates to the field of communications technologies, and in particular, to a method and an apparatus for implementing a baseband resource pool in an LTE base station.

BACKGROUND OF THE INVENTION

An LTE (Long Term Evolution, long term evolution) base station generally includes a baseband processing module implementing baseband functions, including physical layer protocol processing, a baseband-related algorithm and feature, and the like. Once a base station is deployed, the processing capability is relatively fixed. With protocol evolution and future service development, requirements for the baseband processing capability increase gradually. Several years later, the processing capability of the original baseband processing units, for example, baseband boards, often cannot meet the requirements of new features and algorithms. An operator, however, wants to protect existing investments and reduce impacts on existing services. Therefore, the operator puts forward a requirement for an inter-board baseband resource pool, expecting improvement of the baseband processing capability by adding a baseband processing unit.

Currently, with the popularity of intelligent terminals, the number of users in a cell continuously increases. In an LTE base station, the cell is required to support more and more online and handover users. The LTE base station, however, uses a physical layer RACH (Random Access Channel, random access channel) channel to detect user access requests. Therefore, access of many users causes a higher requirement on the baseband RACH processing capability of the eNB (evolved NodeB, evolved NodeB).

In the LTE base station, RACH processing capability insufficiency of existing baseband modules needs to be solved using baseband resource pool technologies. Existing baseband resource pool technologies always implement baseband resource sharing inside a baseband processing module, for example, a baseband board, and implement exchange of redundant cell data between baseband modules. No technical solution is provided for implementing RACH processing capability extension between baseband boards using a baseband resource pool.

SUMMARY OF THE INVENTION

The present invention provides a method for implementing a baseband resource pool in an LTE base station to implement RACH processing capability extension between baseband boards using the baseband resource pool.

In order to achieve the above objective, the present invention provides a method for implementing a baseband resource pool in an LTE base station, where the LTE base station includes a main control module, a master board, and a slave board, the master board and the slave board include baseband processing modules, and the method includes:

configuring, by the main control module, information about a cell requiring load sharing on the master board to the slave board;

modifying, by the main control module, PRACH (Physical Random Access Channel, physical random access channel) configuration parameters of the cell according to baseband processing capability of the LTE base station;

configuring, by the main control module, an RACH resource allocation policy; and performing, by the master board and the slave board, PRACH detection in a time division or frequency division mode according to the RACH resource allocation policy.

The present invention further provides a method for implementing a baseband resource pool in an LTE base station, where the LTE base station includes a main control module, a master board, and a slave board, the master board and the slave board include baseband processing modules, and the method includes:

configuring, by the main control module, information about a cell requiring load sharing on the master board to the slave board;

modifying, by the main control module, PRACH configuration parameters of the cell according to baseband processing capability of the LTE base station;

configuring, by the main control module, an RACH resource allocation policy;

detecting, by the master board and the slave board respectively, different preamble root sequences according to the RACH resource allocation policy; and detecting, by the master board and/or the slave board, a preamble.

The present invention further provides a method for implementing a baseband resource pool in an LTE base station, where the LTE base station includes a main control module, a master board, and a slave board, the master board and the slave board include baseband processing modules, and the method includes:

configuring, by the main control module, information about a cell requiring load sharing on the master board to the slave board;

modifying, by the main control module, PRACH configuration parameters of the cell according to baseband processing capability of the LTE base station;

configuring, by the main control module, an RACH resource allocation policy; and detecting, by the slave board, a PRACH of the cell according to the RACH resource allocation policy.

The present invention further provides an apparatus for implementing a baseband resource pool in an LTE base station, including a main control module, a master board, and a slave board, where:

the main control module is adapted to configure information about a cell requiring load sharing on the master board to the slave board, modify PRACH configuration parameters of the cell according to baseband processing capability of the LTE base station, and configure an RACH resource allocation policy; and the master board and the slave board include baseband processing modules, and are adapted to perform PRACH detection in a time division or frequency division mode according to the RACH resource allocation policy.

The present invention further provides an apparatus for implementing a baseband resource pool in an LTE base station, including a main control module, a master board, and a slave board, where:

the main control module is adapted to configure information about a cell requiring load sharing on the master board to the slave board, modify PRACH configuration parameters of the cell according to baseband processing capability of the LTE base station, and configure an RACH resource allocation policy; and the master board and the slave board include baseband processing modules, and are adapted to respectively detect different preamble root sequences according to the RACH resource allocation policy and detect a preamble.

The present invention further provides an apparatus for implementing a baseband resource pool in an LTE base station, including a main control module, a master board, and a slave board, where:

the main control module is adapted to configure information about a cell requiring load sharing on the master board to the slave board, modify PRACH configuration parameters of the cell according to baseband processing capability of the LTE base station, and configure an RACH resource allocation policy; and the master board and the slave board include baseband processing modules, and the slave board is adapted to detect a PRACH of the cell according to the RACH resource allocation policy.

In the method for implementing a baseband resource pool in an LTE base station provided in the present invention, the LTE base station includes a main control module, a master board, and a slave board, and the master board and the slave board include baseband processing modules. First, the main control module configures information about a cell requiring load sharing on the master board to the slave board; then, the main control module modifies PRACH configuration parameters of the cell according to baseband processing capability of the LTE base station and configures an RACH resource allocation policy; at last, the master board and the slave board perform PRACH detection in a time division or frequency division mode according to the RACH resource allocation policy; or the master board and the slave board respectively detect different preamble root sequences according to the RACH resource allocation policy, and then the master board and/or the slave board detects a preamble; or the slave board detects a PRACH of the cell according to the RACH resource allocation policy. In the method for implementing a baseband resource pool in an LTE base station provided in the present invention, the baseband processing capability of the LTE base station is improved by adding a slave baseband board including a baseband processing module.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

Figure 1:
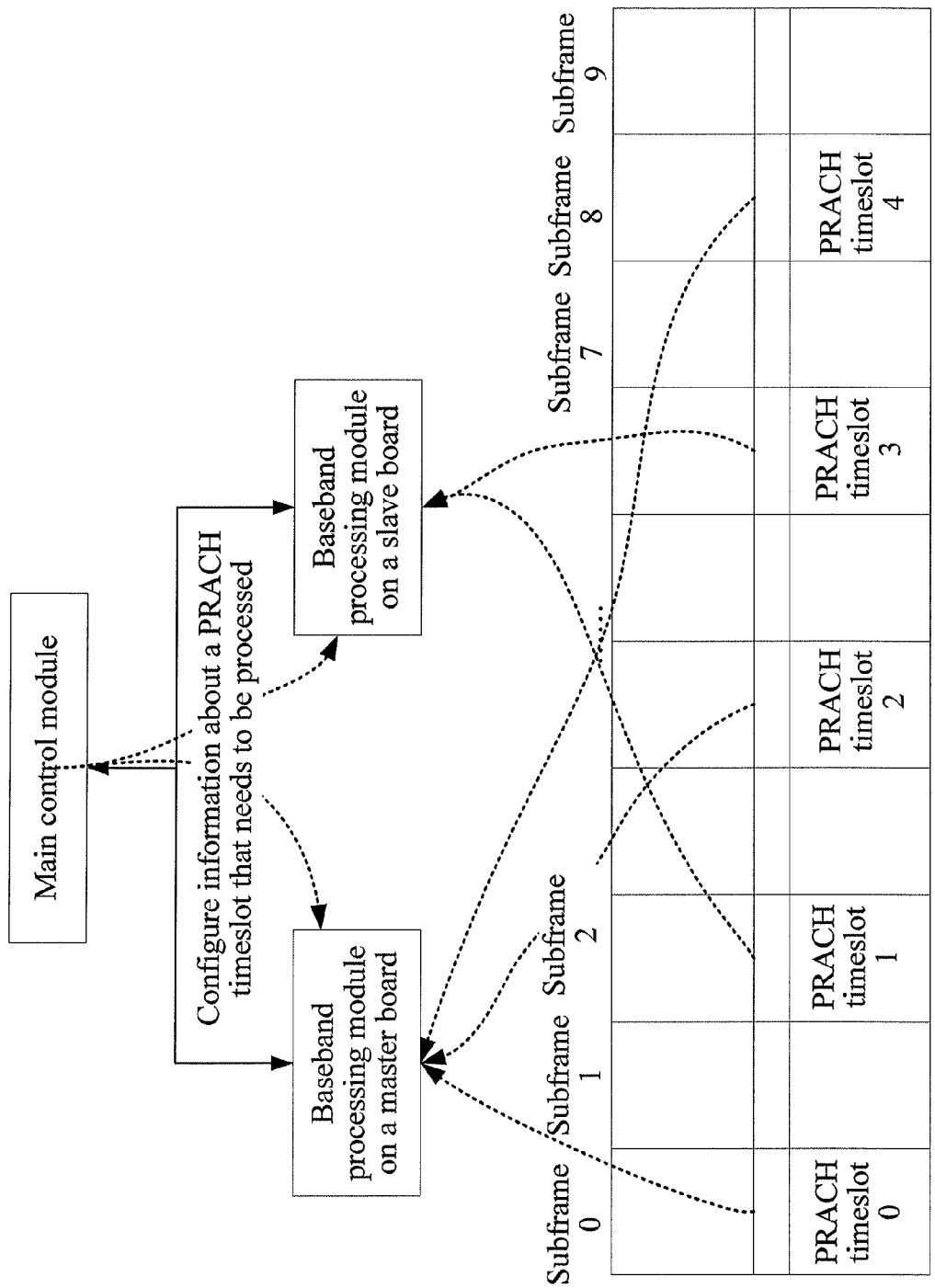
FIG. 1 is a schematic diagram of a method for implementing a baseband resource pool in an LTE base station according to an embodiment of the present invention.

In order to make the technical solutions in the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative effects shall fall within the protection scope of the present invention.

The terms "system" and "network" herein are often used interchangeably herein. The term "and/or" herein is only an association relationship for describing the associated objects, and represents that three relationships may exist, for example, A and/or B may represent the following three cases: A exists separately, A and B exist at the same time, and B exists separately. In addition, the character "/" herein usually represents that the former and latter associated objects are in an "or" relationship.

The existing baseband resource pool technologies generally are the following three technologies.

The first technology is improving the hardware processing capability of a baseband processing module on a baseband board, so as to achieve the purpose of supporting protocol and algorithm evolution, supporting new features, and improving the capacity.

The second technology is baseband resource sharing. The single baseband board in the LTE base station generally uses multiple baseband processing units and supports multiple sectors. There is a low probability that services in multiple sectors simultaneously reach the peak value. Therefore, baseband processing capability resources may be shared by multiple sectors, thereby reducing the entire configuration specification of the baseband processing capability, and saving the cost.

The third technology is baseband resource redundancy backup and energy-saving. That is, services may be migrated to new resources by adding a baseband processing module or using idle module resources when some baseband resources become faulty and unavailable. In this manner, the service continuity is maintained, and the system reliability is improved.

It can be seen that the existing baseband resource pool technologies always implement baseband resource sharing inside a baseband board and implement exchange of redundant cell data between baseband modules. Therefore, the cost of a single baseband board increases. In addition, if the user capacity in the cell coverage is small, the resources will be wasted.

In the prior art, no technical solution is provided for implementing RACH processing capability extension between baseband boards using a baseband resource pool.

In view of the above defects, an embodiment of the present invention provides a method for implementing a baseband resource pool in an LTE base station, where the LTE base station includes a main control module, a master board, and a slave board, the master board and the slave board include baseband processing modules, and the method includes:

configuring, by the main control module, information about a cell requiring load sharing on the master board to the slave board;

modifying, by the main control module, PRACH configuration parameters of the cell according to baseband processing capability of the LTE base station;

configuring, by the main control module, an RACH resource allocation policy; and performing, by the master board and the slave board, PRACH detection in a time division or frequency division mode according to the RACH resource allocation policy.

An embodiment of the present invention further provides a method for implementing a baseband resource pool in an LTE base station, where the LTE base station includes a main control module, a master board, and a slave board, the master board and the slave board include baseband processing modules, and the method includes:

configuring, by the main control module, information about a cell requiring load sharing on the master board to the slave board;

modifying, by the main control module, PRACH configuration parameters of the cell according to baseband processing capability of the LTE base station;

configuring, by the main control module, an RACH resource allocation policy;

detecting, by the master board and the slave board respectively, different preamble root sequences according to the RACH resource allocation policy; and detecting, by the master board and/or the slave board, a preamble.

An embodiment of the present invention further provides a method for implementing a baseband resource pool in an LTE base station, where the LTE base station includes a main control module, a master board, and a slave board, the master board and the slave board include baseband processing modules, and the method includes:

configuring, by the main control module, information about a cell requiring load sharing on the master board to the slave board;

modifying, by the main control module, PRACH configuration parameters of the cell according to baseband processing capability of the LTE base station;

configuring, by the main control module, an RACH resource allocation policy; and detecting, by the slave board, a PRACH of the cell according to the RACH resource allocation policy.

The embodiments are further described below with reference to the accompanying drawings and specific embodiments.

Embodiment 1

Figure 4:
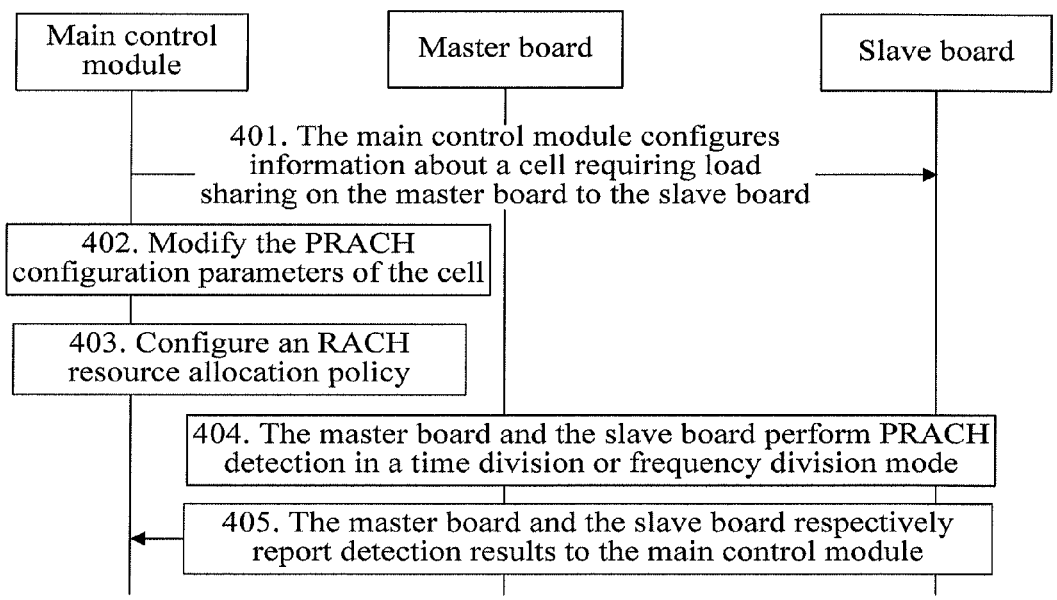
FIG. 4 is a flow chart of a method for implementing a baseband resource pool in an LTE base station according to an embodiment of the present invention.

FIG. 4 is a flow chart of a method for implementing a baseband resource pool in an LTE base station according to an embodiment of the present invention, as shown in FIG. 4.

Step 401: The LTE base station includes a main control module, a master board, and a slave board, the master board and the slave board include baseband processing modules, and the main control module configures information about a cell requiring load sharing on the master board to the slave board.

In the LTE base station, a baseband processing module is added by adding a slave baseband board, more than one slave board may be added, and the original baseband board including a baseband processing module in the LTE base station, namely, the eNB, serves as the master board. The main control module configures information about a cell requiring load sharing on the master board to a baseband processing module on the slave board.

Step 402: The main control module modifies the PRACH configuration parameters of the cell according to the baseband processing capability of the LTE base station.

After a baseband board including a baseband processing module is added as a slave board in the LTE base station, the main control module automatically identifies that the baseband processing capability is added, and then modifies the PRACH configuration parameters of a cell requiring load sharing on the master board according to the baseband processing capability of the LTE base station. Through modification of the PRACH configuration parameters of the cell, the PRACH period of the cell may be shortened, or the number of the PRACH root sequences of the cell may be increased. In this manner, the conflicts of user access to the cell are reduced, the user access delay is shortened, and the specification of the number of access users per second is improved.

Alternatively, through modification of the PRACH configuration parameters of the cell, the number of PRACH channels per TTI (Transmission Time Interval, transmission time interval) may be increased while the PRACH period of the cell remains unchanged and the number of the PRACH root sequences of the cell remains unchanged. In this manner, the conflicts of user access to the cell are reduced, the user access delay is shortened, and the specification of the number of access users per second is improved.

Step 403: The main control module configures an RACH resource allocation policy.

As shown in FIG. 1, for the FDD (Frequency Division Duplex, frequency division duplex) or TDD (Time Division Duplex, time division duplex) mode, in the case that each PRACH timeslot has only one PRACH physical channel, the main control module configures the baseband processing modules on the master board and the slave board to perform PRACH detection alternately according to PRACH timeslots, that is, PRACH timeslots 0/2/4 . . . are processed by the master board, and PRACH timeslots 1/3/5 . . . are processed by the slave board. It should be noted that the PRACH timeslot and the subframe number are different concepts.

Figure 2:
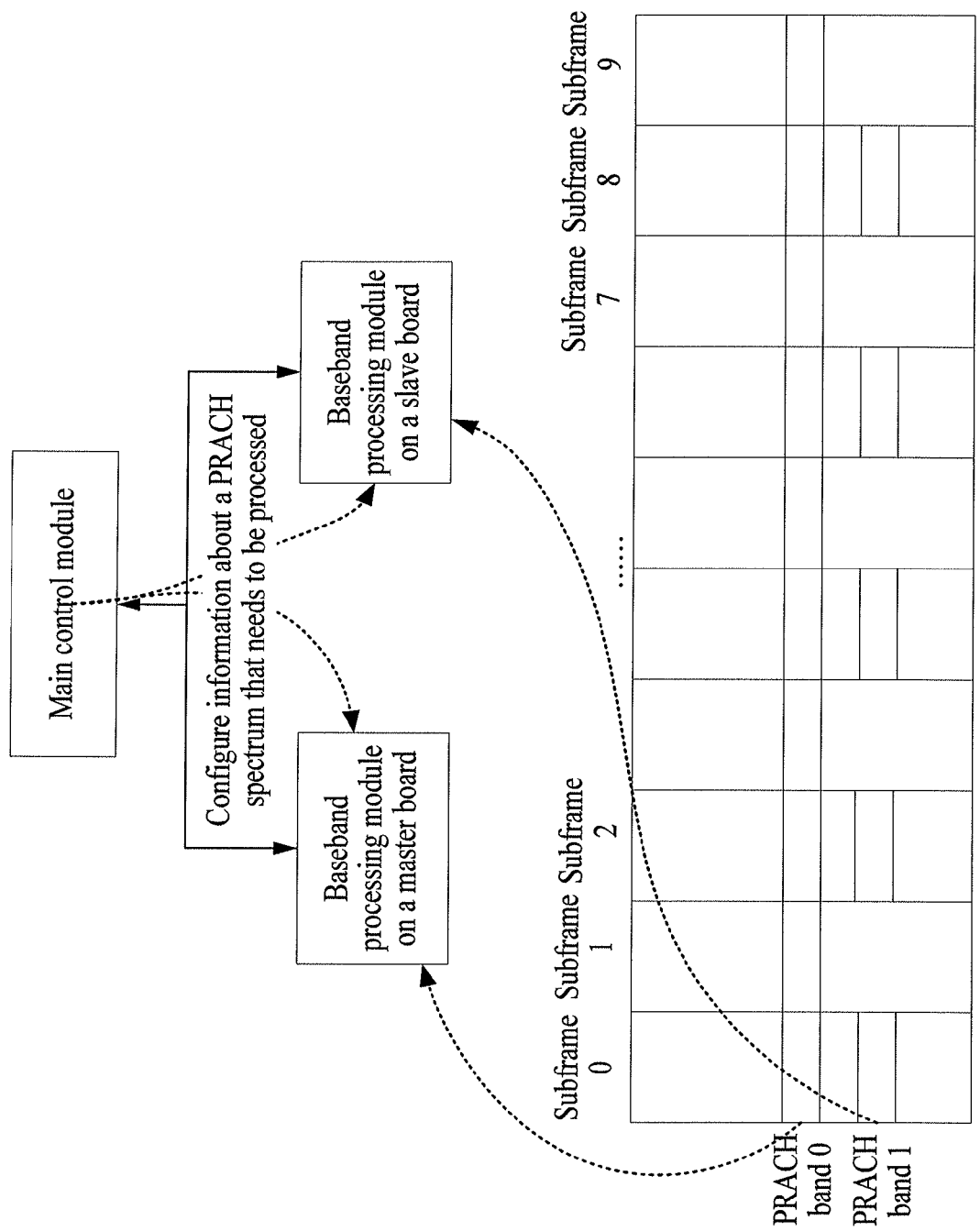
FIG. 2 is a schematic diagram of a method for implementing a baseband resource pool in an LTE base station according to an embodiment of the present invention.

As shown in FIG. 2, for the TDD mode, the main control module configures the baseband processing modules on the master board and the slave board to simultaneously and respectively perform PRACH detection on different PRACH physical channels in the case that each PRACH timeslot has more than one PRACH physical channel.

Step 404: The master board and the slave board perform PRACH detection in a time division or frequency division mode according to the RACH resource allocation policy.

The baseband processing modules on the master board and the slave board respectively perform PRACH detection in PRACH timeslots configured by the main control module, or the baseband processing modules on the master board and the slave board simultaneously and respectively perform PRACH detection on PRACH physical channels configured by the main control module.

Step 405: The master board and the slave board respectively report detection results to the main control module.

After the master board and the slave board respectively report the detection results to the main control module, the main control module processes the detection results according to the normal user access process.

Figure 3:
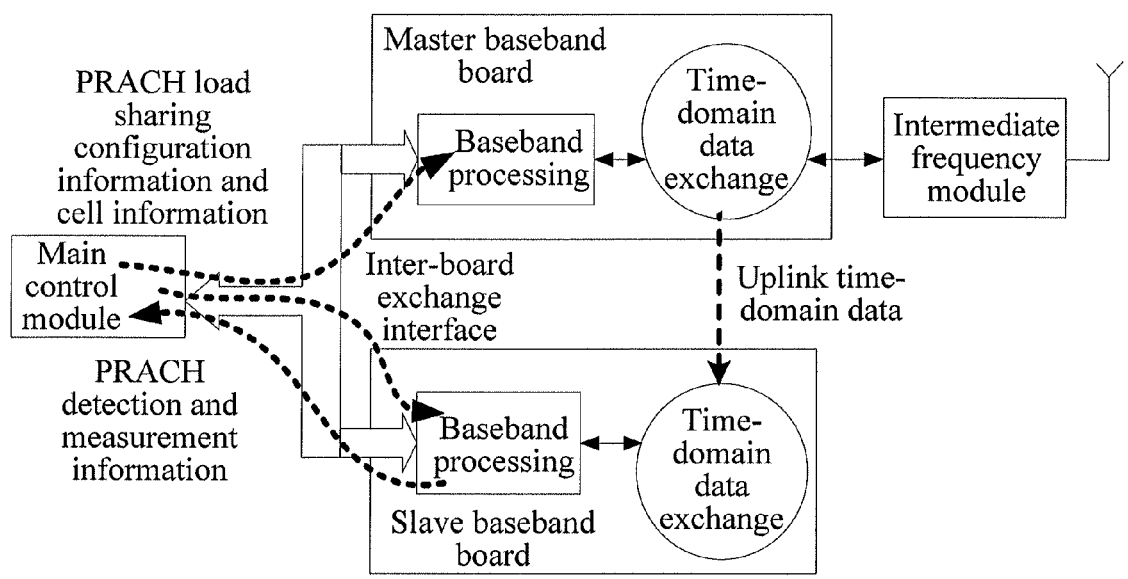
FIG. 3 is a schematic diagram of data interaction between baseband boards in an LTE base station according to an embodiment of the present invention.

This embodiment involves data interaction between baseband boards. The specific interaction mode is shown in FIG. 3. The main control module sends the information about a cell requiring PRACH load sharing and the PRACH load configuration information to the baseband processing modules on the master and slave boards respectively through an inter-board exchange interface. Then, the main control module configures an inter-board time-domain exchange network to forward an uplink time-domain signal of the cell requiring PRACH load sharing to an exchange interface on the slave board through an inter-board time-domain exchange interface, and thereby sends the signal to the baseband processing module on the slave board. The baseband processing module on the slave board may also send some PRACH detection and measurement results to the baseband processing module on the master board through the inter-board exchange interface or to the main control module directly, depending on the specific baseband processing algorithm.

Embodiment 2

Figure 6:
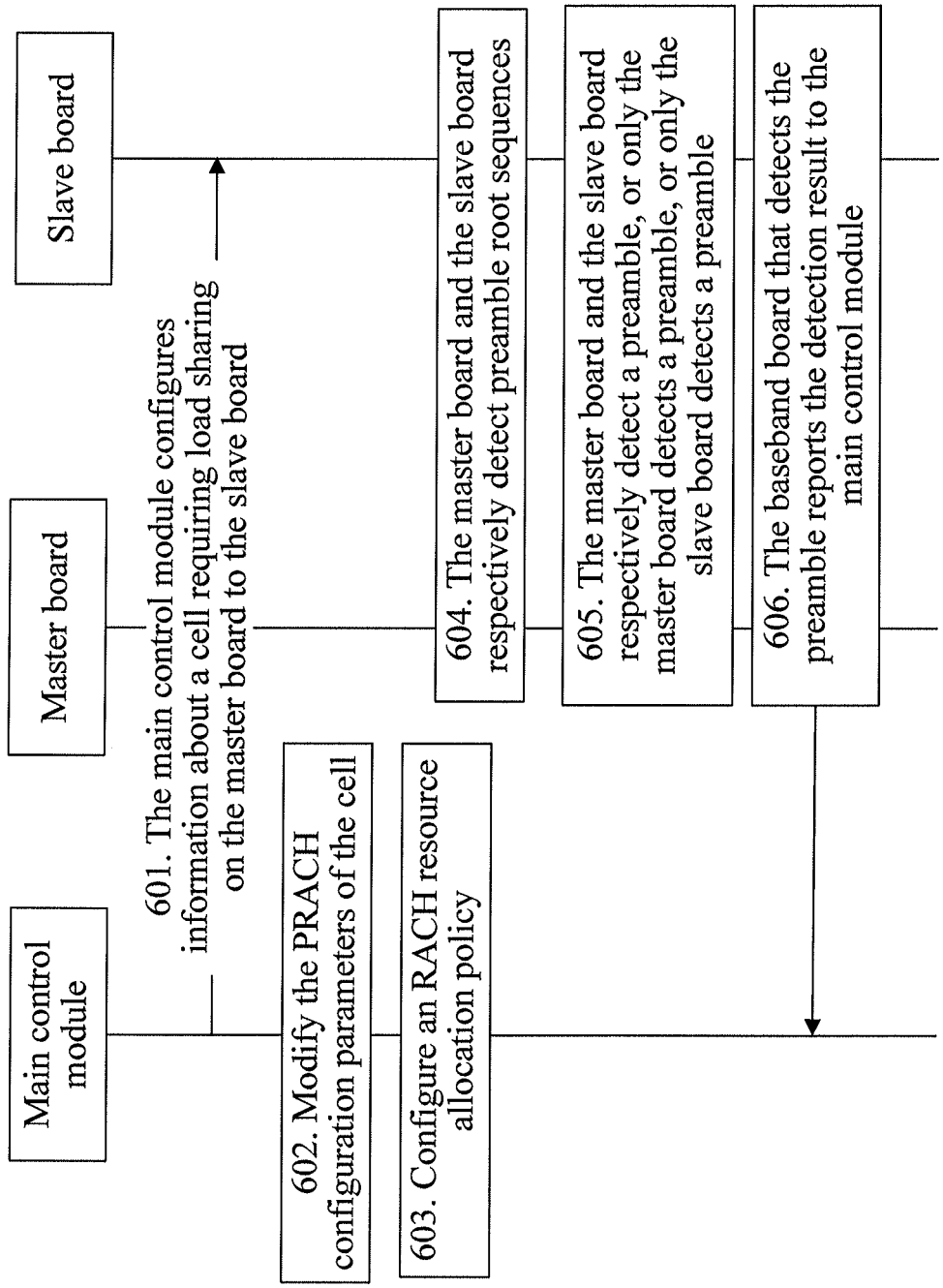
FIG. 6 is a flow chart of a method for implementing a baseband resource pool in an LTE base station according to an embodiment of the present invention.

FIG. 6 is a flow chart of another method for implementing a baseband resource pool in an LTE base station according to an embodiment of the present invention, as shown in FIG. 6.

Step 601: The LTE base station includes a main control module, a master board, and a slave board, the master board and the slave board include baseband processing modules, and the main control module configures information about a cell requiring load sharing on the master board to the slave board.

In the LTE base station, a baseband processing module is added by adding a slave baseband board, more than one slave board may be added, and the original baseband board including a baseband processing module in the LTE base station, namely, the eNB, serves as the master board. The main control module configures information about a cell requiring load sharing on the master board to a baseband processing module on the slave board.

Step 602: The main control module modifies the PRACH configuration parameters of the cell according to the baseband processing capability of the LTE base station.

After a baseband board including a baseband processing module is added as a slave board in the LTE base station, the main control module automatically identifies that the baseband processing capability is added, and then modifies the PRACH configuration parameters of a cell requiring load sharing on the master board according to the baseband processing capability of the LTE base station. Through modification of the PRACH configuration parameters of the cell, the number of the root sequences of the cell may be increased in the case that the PRACH period of the cell remains unchanged. In this manner, the conflicts of user access to the cell are reduced, the user access delay is shortened, and the specification of the number of access users per second is improved.

Step 603: The main control module configures an RACH resource allocation policy.

Figure 5:
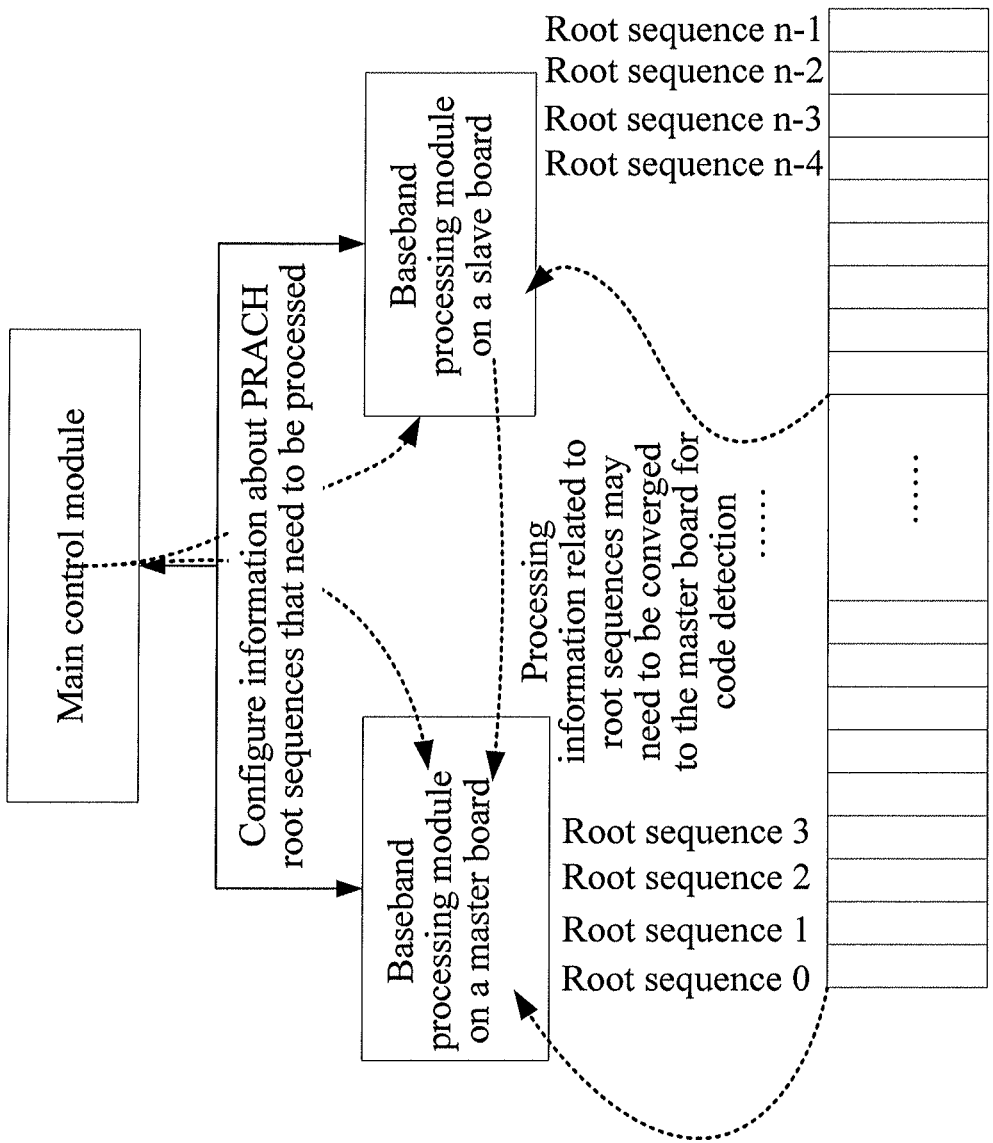
FIG. 5 is a schematic diagram of a method for implementing a baseband resource pool in an LTE base station according to an embodiment of the present invention.

As shown in FIG. 5, the main control module configures an RACH resource allocation policy. The main control module configures the master board and the slave board to perform load sharing for the preamble root sequences that need to be detected in a PRACH physical channel of the cell.

The main control module needs to configure the master board and the slave board to perform load sharing according to the load rate of the master board, simultaneously considering the interface traffic.

Step 604: The master board and the slave board respectively detect different preamble root sequences according to the RACH resource allocation policy.

After the main control module configures preamble root sequences for load sharing by the master board and the slave board, the baseband processing modules on the master board and the slave board respectively detect the preamble root sequences load-shared by them.

Step 605: The master board and/or the slave board detects a preamble.

After respectively detecting the preamble root sequences load-shared by them, the baseband processing modules on the master board and the slave board respectively detect the preamble; or the master board and the slave board converge the detection results of the preamble root sequences to the master board, and the baseband processing module on the master board detects the preamble; or the master board and the slave board converge the detection results of the root sequences corresponding to the preamble to the slave board, and the baseband processing module on the slave board detects the preamble. The specific detection method that is selected mainly depends on the corresponding PRACH detection algorithm.

Step 606: The baseband board that detects the preamble reports the detection result to the main control module.

If the preamble is detected by the baseband processing modules on the master board and the slave board respectively, the master board and the slave board report the detection results to the main control module;

if the preamble is detected by the baseband processing module on the master board, the master board reports the detection result to the main control module; and if the preamble is detected by the baseband processing module on the slave board, the slave board reports the detection result to the main control module.

After the baseband board that detects the preamble reports the detection result to the main control module, the main control module processes the detection result according to the normal user access process.

This embodiment involves data interaction between baseband boards. The specific interaction mode is described in Embodiment 1.

Embodiment 3

Figure 8:
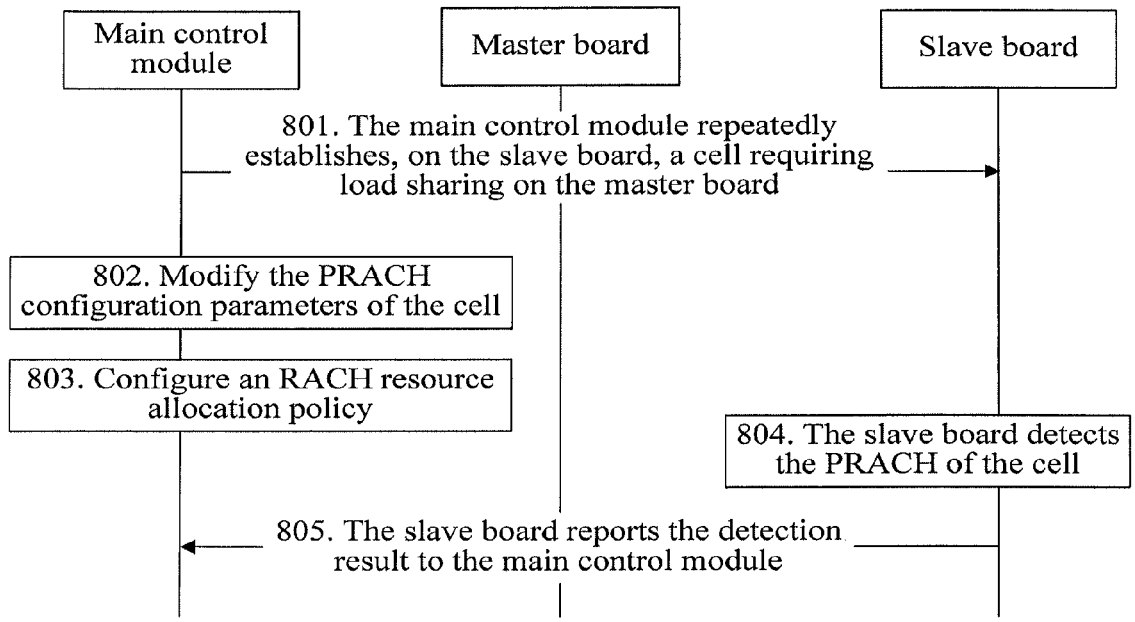
FIG. 8 is a flow chart of a method for implementing a baseband resource pool in an LTE base station according to an embodiment of the present invention.

FIG. 8 is a flow chart of another method for implementing a baseband resource pool in an LTE base station according to an embodiment of the present invention, as shown in FIG. 8.

Step 801: The LTE base station includes a main control module, a master board, and a slave board, the master board and the slave board include baseband processing modules, and the main control module configures information about a cell requiring load sharing on the master board to the slave board.

In the LTE base station, a baseband processing module is added by adding a slave baseband board, more than one slave board may be added, and the original baseband board including a baseband processing module in the LTE base station, namely, the eNB, serves as the master board.

The base station implements RACH access capability extension by inter-board load sharing, RACH processing of some cells on the master board is migrated to an extension board, and the master board and the slave board perform load sharing on the RACH based on the cells. This method is mainly applied in the scenario where the load of a newly added baseband board module is low and the load of the original baseband board module is full during system expansion. A baseband board including a baseband processing module may be added as a slave board, and the original baseband board serves as the master board. As PRACH baseband processing is relatively independent of other physical channel processing, PRACH processing of each cell on the master board may be migrated to the slave board, so that the load on the master board is shared, that is, the main control module sends information about a cell requiring load sharing to the baseband processing module on the slave board.

Step 802: The main control module modifies the PRACH configuration parameters of the cell according to the baseband processing capability of the LTE base station.

Figure 7:
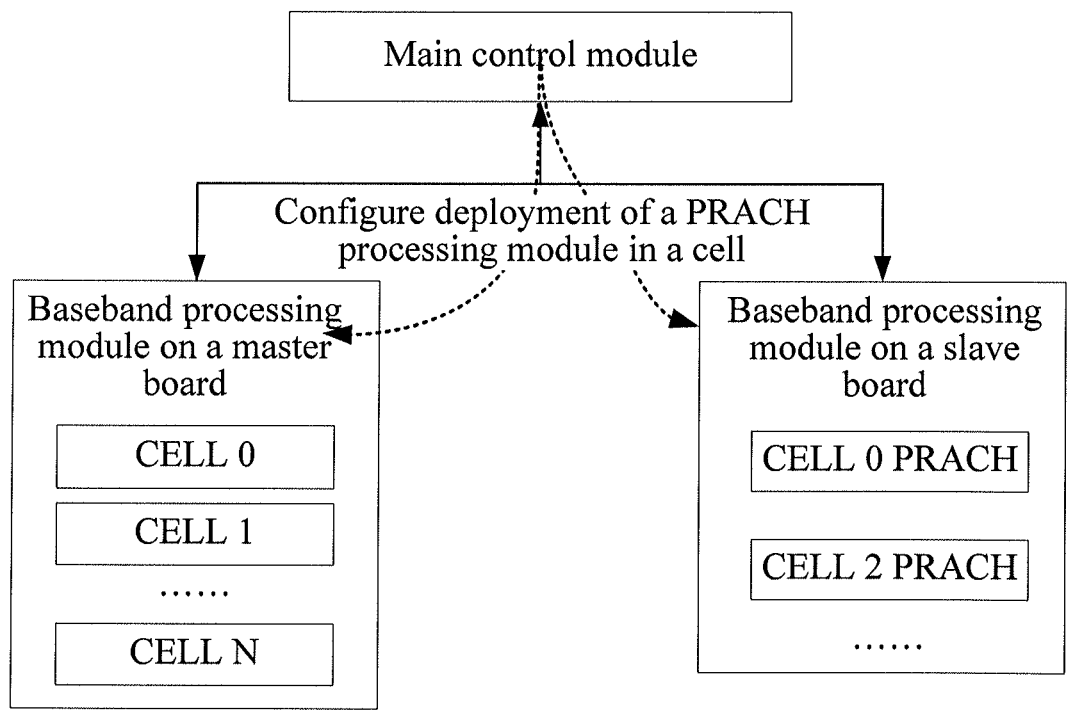
FIG. 7 is a schematic diagram of a method for implementing a baseband resource pool in an LTE base station according to an embodiment of the present invention.

As shown in FIG. 7, after a baseband board including a baseband processing module is added as a slave board in the LTE base station, the main control module automatically identifies that the baseband processing capability is added. Then, the main control module may configure the PRACH configuration parameters of the cell according to the spare processing capability of the slave board to improve the PRACH processing specification of the cell, reduce the conflicts of user access to the cell, shorten the user access delay, and improve the specification of the number of access users per second.

As PRACH processing of the cell is migrated to the slave board, the operating capability of the original PRACH processing part of the baseband module on the master board is released and may be used to process other uplink and downlink physical channels. The main control module may modify the configuration parameters of a corresponding physical channel according to the features of the current services to improve the processing specification of the physical channel.

Step 803: The main control module configures an RACH resource allocation policy.

The main control module configures the master board not to detect a PRACH of the cell and configures the slave board to detect the PRACH of the cell.

Step 804: The slave board detects the PRACH of the cell according to the RACH resource allocation policy.

Step 805: The slave board reports the detection result to the main control module.

After the slave board reports the detection result to the main control module, the main control module processes the detection result according to the normal user access process.

This embodiment involves data interaction between baseband boards. The specific interaction mode is described in Embodiment 1.

In the method for implementing a baseband resource pool in an LTE base station provided in the embodiment of the present invention, a baseband processing module is added by adding a slave baseband board, and load sharing is implemented between baseband processing modules on the master baseband board and the slave baseband board. In this manner, the RACH processing capability of the LTE base station is improved, supporting specification improvement of the LTE base station.

Embodiment 4

Figure 9:
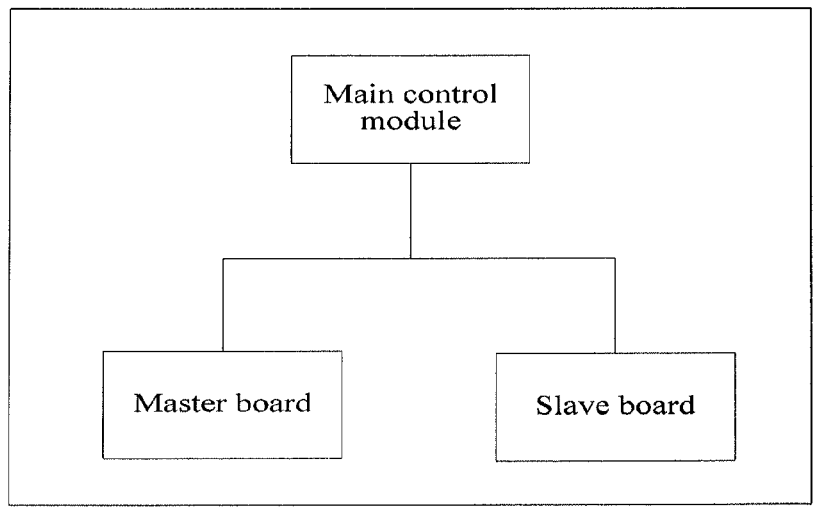
FIG. 9 is a structural diagram of an apparatus for implementing a baseband resource pool in an LTE base station according to an embodiment of the present invention.

As shown in FIG. 9, based on the preceding method embodiment, the embodiment of the present invention further provides an apparatus for implementing a baseband resource pool in an LTE base station, including a main control module, a master board, and a slave board.

The main control module is adapted to configure information about a cell requiring load sharing on the master board to the slave board, modify PRACH configuration parameters of the cell according to baseband processing capability of the LTE base station, and configure an RACH resource allocation policy.

The master board and the slave board include baseband processing modules, and are adapted to perform PRACH detection in a time division or frequency division mode according to the RACH resource allocation policy and respectively report detection results to the main control module.

The configuring the RACH resource allocation policy refers to that the main control module configures the baseband processing modules on the master board and the slave board to perform PRACH detection alternately according to PRACH timeslots in the case that each PRACH timeslot has only one PRACH physical channel; or the main control module configures the baseband processing modules on the master board and the slave board to simultaneously and respectively perform PRACH detection on different PRACH physical channels in the case that each PRACH timeslot has more than one PRACH physical channel.

The performing PRACH detection in the time division or frequency division mode refers to that the baseband processing modules on the master board and the slave board perform PRACH detection in PRACH timeslots configured by the main control module respectively; or the baseband processing modules on the master board and the slave board simultaneously perform PRACH detection on the PRACH physical channels configured by the main control module.

Embodiment 5

As shown in FIG. 9, based on the preceding method embodiment, the embodiment of the present invention further provides an apparatus for implementing a baseband resource pool in an LTE base station, including a main control module, a master board, and a slave board.

The main control module is adapted to configure information about a cell requiring load sharing on the master board to the slave board, modify PRACH configuration parameters of the cell according to baseband processing capability of the LTE base station, and configure an RACH resource allocation policy.

The master board and the slave board include baseband processing modules, and are adapted to respectively detect different preamble root sequences according to the RACH resource allocation policy and detect a preamble, and report detection results to the main control module.

The configuring the RACH resource allocation policy refers to that the main control module configures the master board and the slave board to perform load sharing for the preamble root sequences that need to be detected in a PRACH physical channel of the cell.

The respectively detecting different preamble root sequences and detecting the preamble refers to that, after the main control module configures preamble root sequences for load sharing by the master board and the slave board, the baseband processing modules on the master board and the slave board respectively detect preamble root sequences load-shared by them and then respectively detect the preamble; or the master board and the slave board converge the detection results of the preamble root sequences to the master board, and the baseband processing module on the master board detects the preamble; or the master board and the slave board converge the detection results of the root sequences corresponding to the preamble to the slave board, and the baseband processing module on the slave board detects the preamble. The specific detection method that is selected mainly depends on the corresponding PRACH detection algorithm.

Embodiment 6

As shown in FIG. 9, based on the preceding method embodiment, the embodiment of the present invention further provides an apparatus for implementing a baseband resource pool in an LTE base station, including a main control module, a master board, and a slave board.

The main control module is adapted to configure information about a cell requiring load sharing on the master board to the slave board, modify PRACH configuration parameters of the cell according to baseband processing capability of the LTE base station, and configure an RACH resource allocation policy.

The master board and the slave board include baseband processing modules, and the slave board is adapted to detect a PRACH of the cell according to the RACH resource allocation policy configured by the main control module.

The configuring the RACH resource allocation policy refers to that the main control module configures the master board not to detect a PRACH of the cell and configures the slave board to detect the PRACH of the cell.

It can be clearly understood by persons skilled in the art that, for the purpose of convenient and brief description, for the detailed working process of the foregoing system, apparatus and unit, reference may be made to the corresponding process in the method embodiments, and the details will not be described herein again.

In the embodiments provided in the present invention, it should be understood that the disclosed system, apparatus, and method may be implemented in other modes. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network elements. A part or all of the units may be selected according to the actual needs to achieve the objectives of the solutions of the embodiments.

In addition, functional units in the embodiments of the present invention may be integrated into a processing unit, or each of the units may exist alone physically, or two or more units are integrated into a unit. The integrated unit may be implemented in the form of hardware, or may be implemented in the form of a software functional unit.

When being implemented in the form of a software functional unit and sold or used as a separate product, the integrated unit may be stored in a computer-readable storage medium. Based on such understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device, or the like) to execute all or a part of steps of the methods described in the embodiments of the present invention. The storage medium includes: any medium that can store program codes, such as a U-disk, a removable hard disk, a read-only memory (ROM, Read-Only Memory), a random access memory (RAM, Random Access Memory), a magnetic disk, or an optical disk.

The foregoing describes only exemplary embodiments of the present invention, so that persons skilled in the art can understand or implement the present invention. Various modifications of the embodiments are apparent to persons skilled in the art, and general principles defined herein can be implemented in other embodiments without departing from the spirit or scope of the present invention. Therefore, the present invention is not limited to the embodiments shown herein, but intends to cover the most extensive scope consistent with the principle and the novel features disclosed herein.

What is claimed is:

1. A method for implementing a baseband resource pool in an Long Term Evolution (LTE) base station, wherein the LTE base station comprises a main control module, a master board, and at least one slave board, and the master board and the slave board comprise baseband processing modules, the method comprising:
    configuring, by the main control module, information about a cell requiring load sharing on the master board to the slave board;
    configuring, by the main control module, a Random Access Channel (RACH) resource allocation policy;
    sending, by the master board, a signal of the cell requiring load sharing on the master board to the slave board; and
    performing, by the master board and the slave board, PRACH detection on the signal of the cell requiring load sharing in a time division or frequency division mode according to the RACH resource allocation policy;
    wherein the configuring, by the main control module, the RACH resource allocation policy comprises:
    configuring, by the main control module, the baseband processing modules on the master board and the slave board to perform PRACH detection alternately according to PRACH timeslots when each PRACH timeslot has only one PRACH physical channel; and
    configuring, by the main control module, the baseband processing modules on the master board and the slave board to simultaneously and respectively perform PRACH detection on different PRACH physical channels when each PRACH timeslot has more than one PRACH physical channel.

2. The method according to claim 1, wherein the different PRACH physical channels are PRACH physical channels in different frequency resources.

3. The method according to claim 1, wherein the performing, by the master board and the slave board, PRACH detection on the signal of the cell requiring load sharing in the time division mode according to the RACH resource allocation policy is specifically:

performing, by the baseband processing modules on the master board and the slave board, PRACH detection on the signal of the cell requiring load sharing in PRACH timeslots configured by the main control module; and the performing, by the master board and the slave board, PRACH detection on the signal of the cell requiring load sharing in the frequency division mode according to the RACH resource allocation policy is specifically:

performing, by the baseband processing modules on the master board and the slave board simultaneously and respectively, PRACH detection on the signal of the cell requiring load sharing on PRACH physical channels configured by the main control module.

4. The method according to claim 1, further comprising:
reporting, by the master board and the slave board respectively, detection results to the main control module after the performing, by the master board and the slave board, PRACH detection in the time division or frequency division mode according to the RACH resource allocation policy.

5. An apparatus for implementing a baseband resource pool in an Long Term Evolution (LTE) base station, comprising a main control module, a master board, and a slave board, wherein:

the main control module is adapted to configure information about a cell requiring load sharing on the master board to the slave board, modify Physical Random Access Channel (PRACH) configuration parameters of the cell according to baseband processing capability of the LTE base station, and configure an Random Access Channel (RACH) resource allocation policy; and the master board and the slave board comprise baseband processing modules, and are adapted to perform PRACH detection in a time division or frequency division mode according to the RACH resource allocation policy;

the main control module configures the baseband processing modules on the master board and the slave board to perform PRACH detection alternately according to PRACH timeslots in the case that each PRACH timeslot has only one PRACH physical channel; and the main control module configures the baseband processing modules on the master board and the slave board to simultaneously and respectively perform PRACH detection on different PRACH physical channels in the case that each PRACH timeslot has more than one PRACH physical channel.

6. The apparatus according to claim 5, wherein the master board and the slave board are adapted to perform PRACH detection on the signal of the cell requiring load sharing in a time division or frequency division mode according to the RACH resource allocation policy is specifically:

the master board and the slave board are adapted to perform PRACH detection on the signal of the cell requiring load sharing in PRACH timeslots configured by the main control module; or the master board and the slave board are adapted to perform simultaneously and respectively, PRACH detection on the signal of the cell requiring load sharing on PRACH physical channels configured by the main control module.

7. An apparatus for implementing a baseband resource pool in a Long Term Evolution (LTE) base station, comprising a main control module, a master board, and at least one slave board, wherein:

the main control module is adapted to configure information about a cell requiring load sharing on the master board to the slave board, and configure an Random Access Channel (RACH) resource allocation policy; and the master board and the slave board comprise baseband processing modules, the master board is adapted to send a signal of the cell requiring load sharing on the master board to the slave board, and the master board and the slave board are adapted to respectively detect different preamble root sequences of the signal of the cell requiring load sharing according to the RACH resource allocation policy and detect a preamble;

the main control module configures the baseband processing modules on the master board and the slave board to perform PRACH detection alternately according to PRACH timeslots when each PRACH timeslot has only one PRACH physical channel; and the main control module configures the baseband processing modules on the master board and the slave board to simultaneously and respectively perform PRACH detection on different PRACH physical channels when each PRACH timeslot has more than one PRACH physical channel.

8. The apparatus according to claim 7, wherein the main control module is adapted to configure an RACH resource allocation policy is specifically:

the main control module is adapted to configure the master board and the slave board to perform load sharing for preamble root sequences that need to be detected in a PRACH physical channel of the cell.

9. The apparatus according to claim 7, wherein the master board and the slave board are adapted to respectively detect different preamble root sequences of the signal of the cell requiring load sharing according to the RACH resource allocation policy is specifically:

the master board and the slave board are adapted to respectively detect preamble root sequences load-shared by them;

the master board and the slave board are adapted to detect a preamble is specifically:

the master board and the slave board are adapted to respectively detect the preamble according to a corresponding PRACH detection algorithm; or the master board and the slave board converge, detection results of the preamble root sequences to the master board, and the master board detect the preamble; or the master board and the slave board converge detection results of the root sequences corresponding to the preamble to the slave board, and the slave board detect the preamble.

* * * * *